Patented May 19, 1936

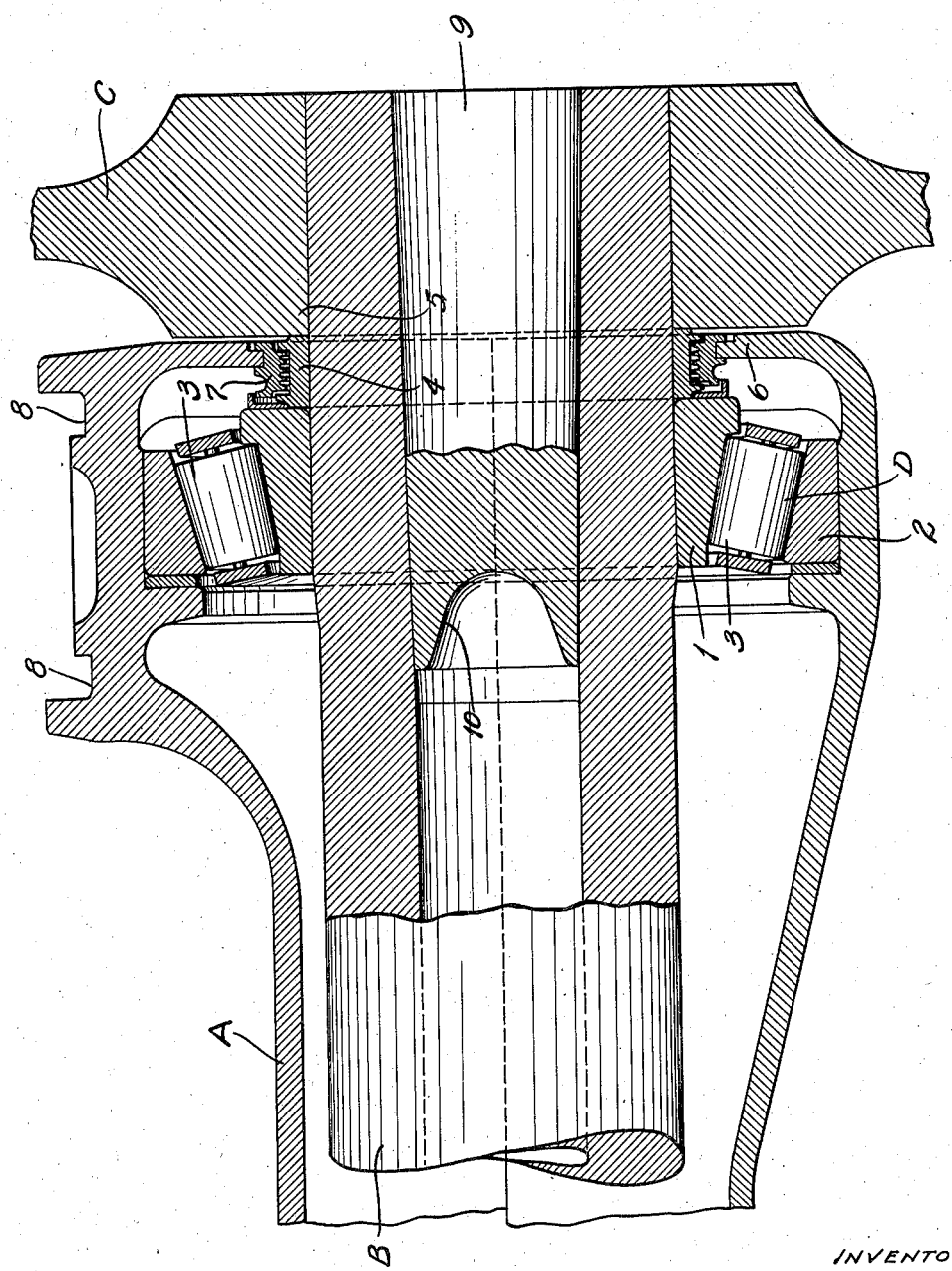

2,041,162

UNITED STATES PATENT OFFICE 2,041,162

ROLLER BEARING AXLE

Tracy V. Buckwalter, Canton, Ohio, assignor to The Timken Roller Bearing Company, Canton, Ohio, a corporation of Ohio Application October 12, 1934, Serial No. 748,014

18 Claims. (Cl. 295—36)

This invention relates to constructions of the kind wherein a tubular load carrying shaft, such as a railway car axle, that is subject to bending or deflection in service, has a member or members, such as a wheel and/or roller bearing raceway member, shrunk on or secured with a heavy press-fit to said shaft. Such a shaft is subject not only to stresses due to its action as a beam, but is also subject to circumferential or hoop stresses occasioned by the pressure of the member press-fitted thereon. The beam stresses operate substantially throughout the length of the shaft while the hoop stresses are limited to the portions of the shaft covered by the member seated tightly thereon and entail abrupt changes of stress in the shaft at an end of said member with consequent liability to fracture. The principal object of the present invention is to avoid such abrupt changes of stress and develop the full strength of the tubular shaft. The invention consists principally in reinforcing the hollow shaft with a plug tightly fitted in the bore thereof adjacent to the area covered by the member tightly fitted thereon and in providing the end of the plug with a relatively deep outwardly flared concavity adapted to bring about a gradual unloading of the hoop stresses from the portion of the shaft engaged by said member to the portion located beyond said member. The invention also consists in the parts and in the combinations and arrangements of parts hereinafter described and claimed.

The accompanying drawing, which forms part of this specification, is a vertical longitudinal sectional view of an end portion of a roller bearing railway car axle construction conforming to my invention.

Referring to the accompanying drawing, my invention is shown in connection with a roller bearing railway car axle construction of the inboard type; but it is also applicable to constructions of the outboard type and to other hollow shaft constructions having bearing or other ring members tightly fitted thereon. The construction shown in the drawing comprises a horizontally split housing A, a tubular load carrying shaft or axle B extending beyond the end of said housing and having a wheel C thereon, and a roller bearing, preferably a taper roller bearing D, interposed between said housing and said axle for transmitting the load to the latter. The taper roller bearing D comprises a cone or inner raceway member 1 mounted on the axle B, a cup or outer raceway member 2 mounted in the end of the axle housing A, and conical bearing rollers 3 interposed between said cup and said cone. A suitable spacer ring 4 is mounted on the axle B between the adjacent ends of the inner raceway member 1 and the hub 5 of the wheel C; and the end of said axle housing is closed by means of an integral end flange 6 having an annular oil ring 7 that is mounted in the axle receiving opening of said end flange and closely encircles said spacer ring. The load is transmitted to the housing A by equalizing bars (not shown), which rest upon seats 8 provided therefor in the top of said housing above the roller bearing D. The axle B has its outside diameter reduced slightly inwardly of the inner raceway member 1 so as to reduce the weight of the axle and to provide for elastic absorption of impact stresses.

The wheel hub 5 and the inner raceway member 1 are shrunk on or secured with a heavy press-fit to the hollow axle A in accordance with the usual or other suitable practice. To prevent the wheel hub and the inner raceway member from becoming loose on the tubular axle, a plug 9 is tightly fitted in the bore of the axle adjacent to the portion covered by said wheel hub of said raceway member. Preferably, the plug 9 has a slight taper towards its inner ends; and the ends of the axial bore of the tubular axle flare out slightly conformably to such taper. The plug 9 is forced or pressed into the end of the axle after the wheel hub and inner raceway member are pressed thereon, or they may be "frozen" or cooled to decrease their diameter and inserted in place while "frozen". The effect of the plug fitted tightly into the bore of the axle is to prevent the wheel and inner raceway member from becoming loose thereon and at the same time reinforce the end of the axle so as to make it operate as if it were solid.

In the construction thus far described, the tight fit of the wheel hub and the inner raceway member on the axle causes an abrupt change of beam stress and hoop stress in the axle at the inner end of said inner raceway member; and it is at this point that fracture is most likely to occur.

In order to prevent such fracture of the axle, it is desirable to secure a gradual change or wider distribution of the stresses which bring about such fracture. According to the present invention, such distribution of the axle stresses at the inner end of the inner raceway member is accomplished preferably by extending the plug 9 inwardly beyond the inner end of said raceway member and by providing the extended inner end portion of said plug with a recess preferably in the form of a concavity 10. Preferably, the depth of the stress relief recess 10 corresponds substantially to the distance that the inner end of the plug 9 projects beyond the inner end of the inner raceway member.

Stress relief may be obtained by means of recesses of various size and shape, but experiments indicate that the greatest relief is obtained with a relatively deep outwardly flared recess. With this arrangement, the flared or cone-shaped recess in the axle plug forms a thickness of metal between the recess and the axle bore adjacent to the inner end of the inner raceway member which gradually decreases in thickness from said end of said raceway member to the inner end of the plug, whereby the stresses occasioned by the tight fit of the raceway member and the wheel hub on the axle are deconcentrated and drop off gradually from a maximum at the inner end of the raceway member to a minimum at the inner end of the plug and thus prevent fracture between these points.

While the invention is described as applicable to a roller bearing axle, it is obvious that it is equally applicable to other constructions wherein a member has a tight fit on a tubular shaft. It is also obvious that the invention may be used separately with either a wheel hub or an inner raceway member, and that the plug may be recessed at one or both ends of the wheel or raceway member, depending on their positions longitudinally of the tubular axle.

What I claim is:

1. A hollow shaft, a ring member seated tightly thereon and a plug tightly fitted in that portion of the bore of said shaft on which the ring member is mounted, said plug having a deep concavity in one end thereof adapted to prevent concentration of stress in said hollow shaft at said end of said plug occasioned by the tight fit of said ring member on said hollow shaft.

2. A hollow shaft, a ring member seated tightly thereon and a plug tightly fitted in that portion of the bore of said shaft on which the ring member is mounted, said plug being tapered slightly from end to end and having a deep concavity in one end thereof adapted to prevent concentration of stress in said hollow shaft at said end of said plug occasioned by the tight fit of said ring member on said hollow shaft.

3. A hollow shaft, a ring member seated tightly thereon and a plug tightly fitted in that portion of the bore of said shaft on which said ring member is mounted, one end of said plug extending beyond the corresponding end of said ring member and having a concavity therein adapted to prevent concentration of stress in said hollow shaft at said end of said plug occasioned by the tight fit of said ring member on said hollow shaft.

4. A hollow shaft, a ring member seated tightly thereon and a plug tightly fitted in that portion of the bore of said shaft on which said ring member is mounted, one end of said plug extending beyond the corresponding end of said ring member and having a concavity therein of a depth corresponding substantially to the distance that said plug extends beyond said ring member.

5. A hollow shaft, a roller bearing raceway member seated tightly thereon and a plug tightly fitted in that portion of the bore of said axle on which said raceway member is mounted, said plug having a deep concavity in one end thereof adapted to prevent concentration of stress in said hollow shaft at said end of said plug occasioned by the tight fit of said raceway member on said hollow shaft.

6. A hollow shaft, a roller bearing raceway member seated tightly thereon and a plug tightly fitted in that portion of the bore of said axle on which said raceway member is mounted, said plug extending at one end beyond the corresponding end of said raceway member and having a deep concavity therein adapted to prevent concentration of stress in said hollow shaft at said end of said plug occasioned by the tight fit of said raceway member on said hollow shaft.

7. A hollow shaft, a roller bearing raceway member seated tightly thereon and a plug tightly fitted in that portion of the bore of said axle on which said raceway member is mounted, said plug extending at one end beyond the corresponding end of said raceway member and having a deep concavity therein of a depth corresponding substantially to the distance that the plug extends beyond the raceway member.

8. A wheel assembly comprising a hollow axle, a wheel seated tightly thereon and a plug tightly fitted in that portion of the bore of said axle on which said wheel is mounted, said plug having a deep concavity in one end thereof adapted to prevent concentration of stress in said hollow axle at said end of said plug occasioned by the tight fit of said wheel on said hollow axle.

9. A wheel assembly comprising a hollow axle, a wheel seated tightly thereon and a plug tightly fitted in that portion of the bore of said axle on which said wheel is mounted, said plug extending at one end beyond the hub of said wheel and having a deep concavity in said end adapted to prevent concentration of stress in said hollow axle at said end of said plug occasioned by the tight fit of said wheel on said hollow axle.

10. A wheel assembly comprising a hollow axle, a wheel seated tightly thereon and a plug tightly fitted in that portion of the bore of said axle on which said wheel is mounted, said plug extending at one end beyond the hub of said wheel and having a deep concavity in said end of a depth corresponding substantially to the distance that the plug extends beyond the wheel hub.

11. A wheel assembly comprising a hollow axle, a wheel seated tightly on the end thereof and a plug tightly fitted in the end thereof, the bore of said axle flaring at said end from a point adjacent to the inner end of the wheel to the end of said axle, and said plug having a deep concavity in its inner end portion adapted to prevent concentration of stress in said hollow axle at said end of said plug occasioned by the tight fit of said wheel on said hollow axle.

12. In a construction of the kind described, a hollow axle, a wheel press-fitted thereon, a bearing ring press-fitted on said axle adjacent to said wheel, and a plug press-fitted in that portion of said axle on which said wheel and said bearing ring are press-fitted, said plug extending beyond one end of one of said wheels and bearing ring and having a deep concavity in its extended portion adapted to prevent concentration of stress in said hollow axle at said end of said plug occasioned by the tight fit of said wheel and said bearing ring on said hollow axle.

13. In a construction of the kind described, a hollow axle, a wheel press-fitted on each end thereof, a bearing ring press-fitted on the axle inwardly of said wheel, and a plug press-fitted in said end of said axle, the bore of said axle flaring at its ends from points inwardly of said bearing ring, and said plug being tapered conformably with such flaring and extending inwardly beyond said bearing ring, the inwardly extending inner end portion of said plug having a concavity formed therein adapted to prevent concentration of stress in said hollow axle at said end of said plug occasioned by the tight fit of said wheel and said bearing ring on said hollow axle.

14. In a construction of the kind described, a hollow axle, a wheel press-fitted on each end thereof, a bearing ring press-fitted on said axle inwardly of said wheel, and a plug press-fitted in said end of said axle, the bore of said axle flaring slightly at its ends from points inwardly of said bearing ring, and said plug being tapered conformably with such flaring and extending inwardly beyond said bearing ring and provided in its inner end with a relatively deep concavity which substantially reaches the plane of the inner end of said ring.

15. In a construction of the kind described, a hollow axle, a wheel press-fitted on each end thereof, a bearing ring press-fitted on the axle inwardly of said wheel and a plug press-fitted in said end of said axle, the outside diameter of said axle decreasing gradually for a short distance from a plane slightly inwardly of said bearing ring, the bore of said axle flaring slightly at said end from a point inwardly of said bearing ring, and said plug being tapered conformably with such flaring and extending inwardly beyond said bearing ring and provided in its inner end with a relatively deep concavity which substantially reaches the plane of the inner end of said ring.

16. In a construction of the kind described, a hollow axle, a wheel press-fitted on the end thereof, a bearing ring press-fitted on the axle inwardly of said wheel, and a plug press-fitted in said end of said axle, said plug having a deep concavity in its inner end adapted to prevent concentration of stress in said hollow axle at said end of said plug occasioned by the tight fit of said wheel on said hollow axle.

17. In a construction of the kind described, a hollow axle, a wheel press-fitted on the end thereof, a bearing ring press-fitted on the axle inwardly of said wheel, and a plug press-fitted in said end of said axle, said plug extending inwardly beyond said bearing ring and having a deep concavity in its inner end adapted to prevent concentration of stress in said hollow axle at said end of said plug occasioned by the tight fit of said wheel and said bearing ring on said hollow axle.

18. The combination with a tubular axle of a plug press-fitted in the end of said axle, said plug having a relatively deep outwardly flared concavity in its inner end whereby the stresses in said axle occasioned by the press-fit of the plug therein drop off gradually from a maximum at a point opposite the inner end of said recess to a minimum at a point opposite the outer end of said recess.

TRACY V. BUCKWALTER.